Patented July 27, 1948

2,446,102

UNITED STATES PATENT OFFICE 2,446,102

COMPLEX SALTS OF STREPTOMYCIN AND PROCESS FOR PREPARING SAME

Robert L. Peck, Plainfield, N. J., assignor to Merck & Co., Inc., Rahway, N. J., a corporation of New Jersey No Drawing. Application August 24, 1945, Serial No. 612,557

20 Claims. (Cl. 260—210)

This invention relates to the preparation of new and therapeutically useful crystalline salts of streptomycin, particularly complex salts of streptomycin containing inorganic salts, and more particularly to the preparation of crystalline streptomycin complexes containing alkaline earth metal halides.

It has been shown by Schatz, Bugie, and Waksman (Proc. Soc. Exp. Biol. & Med. 55, 66–69 (1944)), that streptomycin is obtained from elaboration products, formed in the cultivation of the microorganism *A. griseus* in a suitable culture medium, by adsorption on activated carbon followed by elution with an acidic solvent in a manner similar to that used for obtaining streptothricin (Proc. Soc. of Exp. Biol. & Med. 49, 207–212 (1942)). Products, such as streptomycin hydrochloride which are thus obtained are in the form of crude concentrates having a potency generally less than 50 U/mg. (A unit of activity that amount of material which will inhibit the growth of a standard strain of *Esherichia coli* in one ml. of a suitable culture medium.)

Concentrates of greatly increased potency can be prepared by a process of selective adsorption and elution as described in a pending application by the present inventor Serial No. 601,337 filed June 23, 1945, and the preparation of a crystalline helianthine salt of streptomycin can be prepared as described in the pending application of his colleague Karl Folkers, Serial No. 601,335 filed June 23, 1945. Streptomycin hydrochloride concentrates having an activity of the order of 600 or more U/mg., obtained by the process of adsorption and elution or by reconverting the helianthine salt to the hydrochloride, are of high purity and are therapeutically useful. These products however are not suitable for extensive use as they are not chemically pure compounds, susceptible to standardization by purely chemical tests, and must be standardized batch-by-batch by tests as to physiological activity.

It is now discovered according to the present invention that certain inorganic acid salts, particularly alkaline earth metal halides combine chemically with acid salts of streptomycin in a suitable solvent medium to form crystalline complex salts containing both the streptomycin acid salt and the inorganic acid salt. These complex salts are of high potency, and by recrystallization can be obtained in substantially pure form. The combined inorganic acid salt, being itself essentially non-toxic, does not impair the therapeutic value of the product. Thus for the first time streptomycin is available in a form which not only has valuable therapeutic properties but also can be produced, distributed, and administered in a practicable way.

In a companion application by the present applicant, Serial No. 612,558, filed August 24, 1945, the preparation of complex salts of the closely related antibiotic substance, streptothricin, has been disclosed.

Regarded in certain of the broader aspects the novel features embodied in the present invention comprise streptomycin complex double salts consisting of an acid salt of streptomycin and an alkaline earth metal halide; and the process for preparing the same by reacting a streptomycin acid salt with an alkali metal halide in a solvent medium and separating the complex salt thus formed by diminishing its solubility in the solvent medium and crystallizing out the substantially pure streptomycin complex salt. The solubility of the complex salt in the solvent medium can be diminished either by evaporating part of the solvent or by adding a miscible solvent in which the complex is only slightly soluble.

In preparing streptomycin complex salts according to the present invention acid salts of streptomycin of moderately high to high potency are preferably employed i. e. acid salts having an activity of the order of 300 U/mg. or higher. Acid salts having an activity or potency below about 300 U/mg. are generally so impure that it is difficult or impossible to recover a crystalline complex. Impure acid salts of this sort can easily be purified to a material having an activity of more than 300 U/mg. by one or more treatments with alumina as disclosed in application Serial No. 601,337 above referred to.

The reaction between the streptomycin acid salt and an alkaline earth metal halide is effected in the presence of an organic solvent or an aqueous-organic, or organic solvent mixture, in which the streptomycin acid salt and the alkaline earth metal halide as well as the resulting complex are freely soluble (i. e. one part of substance will dissolve in 1–10 parts of solvent). At the same time the selected solvent should not be one in which the complex is too highly soluble because of the difficulty in crystallizing the complex from such a solvent.

It has been found that the best single solvent to use in forming and recovering the crystalline complex is methanol, and that the best mixed solvents are aqueous-ethanol, and methanol-ethanol in the ratios of about 1:2 and 5:4 respectively. Other organic solvents such as propanol, isopropanol, and the like can be combined with either water or methanol to give mixed solvents having the desired solubility for the starting materials and final product as above described.

The complex salt formed in the reaction is separated from the solvent medium by diminishing the solubility of the complex salt in the solvent media and then crystallizing out the complex salt. This can be accomplished by evaporating part of the solvent preferably under reduced pressure, or by adding a miscible solvent in which the complex is only slightly soluble. By way of illustration, the solubility of the streptomycin hydrochloride-calcium chloride complex in methanol is about one part to five parts of methanol, whereas the solubility in ethanol is about one part to 100 parts of ethanol. By adding one or more parts by volume of ethanol to a methanol solution of the complex, preferably while heating the methanol solution to about 50 or 60° C., the solubility of the complex in the resulting solvent mixture is materially reduced and precipitation or crystallization of the complex takes place without evaporation of solvent. The complex salt obtained by either of the foregoing procedures can be readily purified by dissolving in a solvent or solvent mixture, not necessarily the same as that originally employed, and recrystallizing the product therefrom.

As starting materials various acid salts of streptomycin can be employed. Hydrohalides such as the hydrochloride, hydrobromide, and hydroiodide are most suitable although other acid salts and notably the helianthine salt of streptomycin can be used as well. These can be reacted with an alkaline earth metal halide such as calcium chloride, calcium bromide, strontium chloride, and the like by admixing at room temperature in a solvent of the type above described.

When a streptomycin hydrohalide is employed as the acid salt, it is added together with an alkaline earth metal halide to the selected solvent with stirring to effect complete solution. The resulting solution is then evaporated or concentrated to a volume such that crystallization of the complex salt takes place. Crystallization will generally commence when the solution contains of the order of 10–40% solids depending upon the particular solvent which is used. Evaporation or concentration can be effected in a partially evacuated (.5–.75 atoms.) desiccator over calcium chloride or by continuous evacuation under reduced pressure. Best crystallization is obtained by slow evaporation at pressures of .5–.75 atmos. but more rapid vacuum concentration at pressures of 30 mm. of mercury or lower does not impair the yield or quality of complex salt recovered.

After suitable concentration or evaporation the resulting solution of the complex salt is allowed to stand to permit maximum crystal formation. The crystals are then separated by filtration, washed with suitable solvents, such as methanol or a methanol-ethanol mixture followed by ethanol and dried, while the mother liquor can be further concentrated to yield additional crops of crystals. The crystals may be dried by heating at about 25° C. in vacuo, and finally by heating to constant weight at 100° C. in vacuo.

The complex salts are very hygroscopic and it is therefore difficult to obtain characteristic melting points. The melting points appear to be of the order 200° C. with decomposition. The complex salts are optically active however and the optical rotation serves as a good measure of the purity of the products. Thus the pure streptomycin hydrochloride-calcium chloride complex, after recrystallization from methanol-ethanol and drying at 100° C. in vacuo has a rotation, $(\alpha)_D^{25} = -77°$ (c, 0.882% in water), and an activity of about 750 U/mg. While the true structural formula for streptomycin, or for the complex hydrochloride-calcium chloride salt is not yet known the empirical formula for the complex is believed to be $(C_{21}H_{39}N_7O_{12} \cdot 3HCl)_2 \cdot CaCl_2$. For this formula the calculated values are C=33.79%; H=5.67%; N=13.14%; Cl=19.00%; and Ca=2.68%. By analysis C=33.67%; H=5.79%; N=13.13%; Cl=19.48%; and Ca=2.87%.

When the helianthine salt of streptomycin is employed as a starting material an amount of calcium chloride or the like is used which is sufficient to first react with the streptomycin salt to form insoluble calcium helianthate and streptomycin hydrochloride and then to form the calcium chloride complex. The insoluble calcium helianthate is filtered off and the filtrate is then evaporated to suitable volume to crystallize out the complex in the manner previously described. The metathetical removal of helianthine as the insoluble calcium salt appears to proceed more smoothly when a very small amount of hydrochloric acid is added to the reaction mixture bringing the pH to approximately 4.

While it has been indicated that the starting streptomycin acid salt should have an activity of about 300 U/mg. or higher, it should be noted that variations in potency above 300 U/mg. do not affect appreciably the purity of crystalline product obtained.

The following examples illustrate various methods of carrying out the present invention, but it is to be understood that these examples are given by way of illustration and not of limitation.

*Example I*

To about 2.0 g. of streptomycin hydrochloride having an activity of about 315 U/mg. is added about 1.5 g. of calcium chloride and about 10 cc. of methanol. The resulting clear solution is evaporated slowly over calcium chloride under slightly reduced pressure (about ⅔ atmos.) after seeding with a minute crystal of streptomycin hydrochloride-calcium chloride complex salt. On standing overnight the first crop of crystals which separates is isolated by conventional methods and dried at 25° C. in vacuo. The complex salt thus obtained has a rotation $(\alpha)_D^{25} = -69°$ (c, 0.97% in water) and an in vitro activity of about 630 U/mg.

*Example II*

To about 1.31 g. of streptomycin hydrochloride having an activity of about 800 U/mg. is added about 4.0 cc. of methanol and about 609 mg. of calcium chloride. The resulting solution is filtered and allowed to evaporate slowly over calcium chloride under slightly reduced pressure (about ⅔ atmos.). The first crop of crystals formed on standing overnight are isolated by conventional procedures and a second crop of crystals is isolated after further evaporation of the mother liquor of the first crop. The streptomycin hydrochloride-calcium chloride complex salt obtained in crops one and two has physical properties as indicated below:

|  | $(\alpha)_D^{25°}$ | Activity units/mg. | Percent N | Percent Ca |
|---|---|---|---|---|
| Crop I | −73° (c, 1.47 in water) | 747 | 12.56 | 3.78 |
| Crop II | −71° (c, 0.593 in water) | 730 | 12.52 | 3.92 |

*Example III*

To about 5.0 g. of streptomycin helianthate in about 150 cc. of methanol is added about 1.2 g. of calcium chloride dissolved in about 25 cc. of methanol. The solution is warmed and filtered through activated charcoal to remove calcium helianthate formed in the reaction. Clear colorless filtrate is concentrated under reduced pressure (.5–.75 atmos.) to a volume of about 10–15 cc. during which time a crystalline deposit separates. This crystalline product is filtered off, washed successively with small amounts of methanol, 1:1 methanol-ethanol mixture and ethanol and dried in vacuo over phosphorus pentoxide at room temperature. The streptomycin hydrochloride-calcium chloride complex thus obtained has a rotation $(\alpha)_D^{25} = -76°$ (c, 1.0% in water) and an in vitro activity of about 750 U/mg. Further concentration of the mother liquor causes separation of a second crop of crystals which when isolated as above described have a rotation $(\alpha)_D^{25} = -75°$ (c, 1.0% in water) and an in vitro activity of about 730 U/mg. Additional small amounts of the crystalline complex salt are obtained by concentrating the mother liquor from the second crop of crystals.

*Example IV*

The process of Example III is repeated and the combined first and second crops of crystalline product are redissolved in about 25 cc. of hot (50–60° C.) methanol, filtered, concentrated to half volume and diluted with 10 cc. of ethanol. After seeding crystals of streptomycin hydrochloride-calcium chloride complex salt separate slowly and crystallization is allowed to continue for about 3 days. The crystalline product thus formed is filtered off, washed with ethanol and dried in vacuo at 100° C. to constant weight. This substantially pure complex salt has an optical rotation $(\alpha)_D^{25} = -70°$ (c, 0.882% in water) an activity of about 750 U/mg. and melts at about 200° C. with decomposition (determination of melting point is difficult, and the results are not well defined due to the very hygroscopic nature of the complex salt). It is found by analysis to contain 33.67% C, 5.79% H, 13.13% N, 19.48% Cl and 2.87% Ca which corresponds favorably with the empirical formula $$(C_{21}H_{39}N_7O_{12} \cdot 3HCl)_2 \cdot CaCl_2$$

having calculated values of 33.79% C, 5.67% H, 13.14% N, 19.00% Cl and 2.68% Ca.

Similar results are obtained by dissolving the complex salt obtained by the process of Example III in 1:9 aqueous-methanol, 1:4 aqueous-ethanol, or other aqueous-lower aliphatic alcohol mixture in which the complex salt is freely soluble, and recrystallizing the complex salt as previously described.

*Example V*

To about 84 mg. streptomycin hydrochloride having an activity of about 750 U/mg. is added about 0.51 cc of methanol and about 33 mg. of calcium-bromide. The mixture is stirred until solution is complete and then is allowed to stand in a desiccator over calcium chloride under slightly reduced pressure (about .5–.75 atmos.) to effect slow evaporation of solvent. Fine needle crystals which are thus formed are filtered off, washed with methanol and dried in vacuo at 56° C. for about two hours. The crystalline streptomycin hydrochloride-calcium bromide complex salt thus obtained has a rotation $(\alpha)_D^{25} = -72°$ (c, 0.667 in water) and an in vitro activity of about 690 U/mg.

*Example VI*

To about 83 mg. of streptomycin hydrochloride having an activity of about 750 U/mg. is added about 0.51 cc of methanol. When this is completely dissolved about 31 mg. of strontium chloride hexahydrate is dissolved in the solution with stirring. The solution is then allowed to stand in a desiccator over calcium chloride under slightly reduced pressure (about .5–.75 atmos.) to effect slow evaporation of solvent. A minute seed of streptomycin hydrochloride-strontium chloride complex is added to initiate crystallization. As evaporation continues, rosettes of fine crystals of the streptomycin hydrochloride-strontium chloride complex salt separate from the solution. These crystals after separation by filtration, washing with methanol and ethanol and drying in vacuo at 56° C. for about two hours have a rotation $(\alpha)_D^{25} = -73°$ (c, 0.53% in water) and an in vitro activity of about 628 U/mg.

*Example VII*

About 30 g. of streptomycin helianthate is dissolved in about 900 cc. of methanol heated to about 50–60° C. To the warm solution is added a solution of 7.2 grams of calcium chloride in 50 cc. of methanol. About three drops of concentrated hydrochloric acid is added to adjust the pH to about 4 and the mixture is filtered through activated charcoal. The filtrate is concentrated in a vacuum concentrator at a pressure of about 30 mm. of mercury to a volume of about 75 cc. and allowed to stand at room temperature. Needle crystals begin to separate within a short time. After standing overnight the crystals of streptomycin hydrochloride-calcium chloride complex are isolated by filtration and dried; yield, 9.2 g. The filtrate from the first crop of crystals is concentrated further to a volume of about 30 cc. On standing a second crop of crystals, 2.3 grams, is obtained. A further yield of 1.1 g. of crystals is obtained by concentration of the second filtrate. Data on the first two crops of crystals after drying at 100° in vacuo are given below.

| Crop | Wt., g. | Activity Units/mg. | $(\alpha)_D$ in water | Analyses | | |
|---|---|---|---|---|---|---|
| | | | | C | H | N |
| I | 9.2 | 753 | Degrees −76 | 33.73 | 5.78 | 13.18 |
| II | 2.3 | 756 | −76 | 33.67 | 5.77 | 12.94 |

*Example VIII*

About 395 mg. of streptomycin acetate, $(\alpha)_D^{25} = -42°$ (c, 1.64% in water), activity about 600 U/mg., and about 194 mg. of calcium chloride were dissolved in about 10 cc. of methanol, filtered, and evaporated slowly to about 3 cc.

under slightly reduced pressure. During the evaporation clumps of needle crystals separate. These crystals were isolated, washed with methanol and dried in vacuo at 25° C. The crystalline streptomycin acetate-calcium chloride complex (about 168 mg.) has a rotation $(\alpha)_D^{25} = 43.7$ (c, 1.49% in water) and an activity of about 500 U/mg. Calcium is present in the crystals, and the acetic acid present is found by analysis to be 19.7% (calculated for

$(C_{21}H_{39}O_{12}N_7 \cdot 3CH_3COOH)_2 \cdot CaCl_2$ acetic acid 22.0%).

Example IX

About 489 mg. of streptomycin hydrobromide, $(\alpha)_D^{25} = -70°$ (c, 1.72% in water), activity about 600 U/mg., and about 243 mg. of calcium chloride are dissolved in about 10 cc. of methanol, filtered and evaporated slowly to about 3 cc. under slightly reduced pressure. During the evaporation, clumps of needle crystals separate. These crystals are isolated, washed with dry methanol, and dried in vacuo at 25° C. The crystalline streptomycin hydrobromide-calcium chloride complex, (about 128 mg.) has a rotation $(\alpha)_D^{25} = -63.5°$ (c, 1.47% in water), and an activity of about 550 U/mg. Calcium is present in the crystals, and elementary analysis gives the following results: Found: C=28.94%; H=5.29%. Calculated for

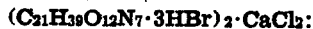

$(C_{21}H_{39}O_{12}N_7 \cdot 3HBr)_2 \cdot CaCl_2$:

C=28.6%; H=4.80%.

The term complex is used throughout the specification and claims to denote compositions having definite crystalline form which can be repeatedly isolated pursuant to described procedures; which have constant chemical composition; and from which the components cannot be separated by means of physical processes such as crystallization and the like.

Modifications may be made in carrying out the present invention without departing from the spirit and scope thereof and the invention is to be limited only by the appended claims.

What is claimed is:

1. As a new composition of matter a streptomycin complex double salt consisting of an acid salt of streptomycin and an alkaline earth metal halide.

2. As a new composition of matter a streptomycin complex double salt consisting of an inorganic acid salt of streptomycin and an alkaline earth metal halide.

3. As a new composition of matter a streptomycin complex double salt consisting of an organic acid salt of streptomycin and an alkaline earth metal halide.

4. As a new composition of matter a streptomycin complex double salt consisting of an acid salt of streptomycin and a calcium halide.

5. As a new composition of matter a streptomycin complex double salt consisting of a streptomycin hydrohalide and a calcium halide.

6. The streptomycin hydrochloride - calcium chloride complex salt.

7. The streptomycin hydrochloride - calcium bromide complex salt.

8. The streptomycin acetate-calcium chloride complex salt.

9. The process for preparing a complex double salt consisting of a streptomycin acid salt and an alkaline earth metal halide that comprises reacting a streptomycin acid salt with an alkaline earth metal halide in a solvent medium in which these reactants and the corresponding complex are freely soluble, and separating the complex salt, thus formed by decreasing the relative amount of said solvent in the reaction mixture to crystallize the streptomycin complex salt.

10. The process for preparing a complex double salt consisting of a streptomycin acid salt and an alkaline earth metal halide that comprises reacting a streptomycin acid salt with an alkaline earth metal halide in a solvent medium in which these reactants and the corresponding complex salt are freely soluble, and evaporating off at least part of said solvent to crystallize the streptomycin complex salt.

11. The process for preparing a complex double salt consisting of a streptomycin acid salt and an alkaline earth metal halide that comprises reacting a streptomycin acid salt with an alkaline earth metal halide in a solvent medium in which these reactants and the corresponding complex salt are freely soluble, and evaporating off at least part of said solvent under reduced pressure to crystallize the streptomycin complex salt.

12. The process for preparing a complex double salt consisting of a streptomycin acid salt and an alkaline earth metal halide that comprises reacting a streptomycin acid salt with an alkaline earth metal halide in a solvent medium in which these reactants and the corresponding complex salt are freely soluble, and adding to the solution thus obtained a miscible solvent in which the complex is only slightly soluble to crystallize the streptomycin complex salt.

13. The process for preparing a substantially pure complex double salt consisting of a streptomycin acid salt and an alkaline earth metal halide that comprises reacting a streptomycin acid salt with an alkaline earth metal halide in a solvent medium in which these reactants and the corresponding complex salt are freely soluble, separating the complex salt thus formed by decreasing the relative amount of said solvent in the reaction mixture to crystallize the substantially pure streptomycin complex salt, recrystallizing the complex salt from a fresh amount of the solvent employed in the reaction and drying the crystalline product thus obtained to constant weight in vacuo at about 100° C.

14. The process for preparing a complex double salt consisting of a streptomycin acid salt and an alkaline earth metal halide that comprises reacting a streptomycin acid salt with an alkaline earth metal halide in methanol, and evaporating off at least part of the methanol to crystallize the streptomycin complex salt.

15. The process for preparing a complex double salt consisting of a streptomycin acid salt and an alkaline earth metal halide that comprises reacting a streptomycin acid salt with an alkaline earth metal halide in an aqueous-lower aliphatic alcohol solvent mixture, and evaporating off at least part of said solvent mixture to crystallize the streptomycin complex salt.

16. The process for preparing a complex double salt consisting of a streptomycin acid salt and an alkaline earth metal halide that comprises reacting a streptomycin acid salt with an alkaline earth metal halide in an aqueous-ethanol solvent mixture, and evaporating off at least part of said solvent mixture to crystallize the streptomycin complex salt.

17. The process for preparing a complex double salt consisting of a streptomycin acid salt and an alkaline earth metal halide that comprises reacting a streptomycin acid salt with an alkaline earth metal halide in a solvent mixture of lower aliphatic alcohols, and evaporating off at least part of said solvent mixture to crystallize the streptomycin complex salt.

18. The process for preparing a complex double salt consisting of a streptomycin acid salt and an alkaline earth metal halide that comprises reacting a streptomycin acid salt with an alkaline earth metal halide in a methanol-ethanol solvent mixture, and evaporating off at least part of said solvent mixture to crystallize the streptomycin complex salt.

19. The process for preparing complex salts consisting of a streptomycin hydrohalide and an alkaline earth metal halide that comprises reacting a streptomycin hydrohalide with an alkaline earth metal halide in a solvent medium in which these reactants and the corresponding complex salt are freely soluble, and separating the complex salt thus formed by decreasing the relative amount of said solvent in the reaction mixture to crystallize the streptomycin complex salt.

20. The process for preparing the streptomycin hydrochloride-calcium chloride complex salt, that comprises reacting streptomycin hydrochloride with calcium chloride in a solvent medium in which these reactants and the complex salt are freely soluble, and separating the complex salt thus formed by decreasing the relative amount of said solvent in the reaction mixture to crystallize the streptomycin salt.

ROBERT L. PECK.